US008737533B2

(12) United States Patent
Andgart et al.

(10) Patent No.: US 8,737,533 B2
(45) Date of Patent: May 27, 2014

(54) METHOD AND ARRANGEMENTS FOR ESTIMATING IQ-IMBALANCE

(75) Inventors: Niklas Andgart, Södra Sandby (SE); Leif Wilhelmsson, Dalby (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 474 days.

(21) Appl. No.: 12/937,069

(22) PCT Filed: Apr. 8, 2009

(86) PCT No.: PCT/EP2009/054183
§ 371 (c)(1),
(2), (4) Date: Oct. 15, 2010

(87) PCT Pub. No.: WO2009/124953
PCT Pub. Date: Oct. 15, 2009

(65) Prior Publication Data
US 2011/0243263 A1    Oct. 6, 2011

Related U.S. Application Data

(60) Provisional application No. 61/047,269, filed on May 19, 2008.

(30) Foreign Application Priority Data

Apr. 11, 2008 (EP) .................. 08154371

(51) Int. Cl.
*H03D 3/00* (2006.01)
(52) U.S. Cl.
USPC .......................................... 375/322
(58) Field of Classification Search
USPC ......... 375/231, 260, 261, 316, 322, 343, 346, 375/349; 370/203, 329, 332, 341, 500
See application file for complete search history.

(56) References Cited

U.S. PATENT DOCUMENTS 7,173,988 B2    2/2007  Cochran et al.
2005/0176436 A1 * 8/2005  Mantravadi et al. .......... 455/450

(Continued)

FOREIGN PATENT DOCUMENTS

WO    2004/025918 A1    3/2004

OTHER PUBLICATIONS

Chrabieh, R. et al. "IQ Imbalance Mitigation via Unbiased Training Sequences." 2007 IEEE Global Telecommunications Conference (Globecom '07), Nov. 1, 2007, pp. 4280-4285.

*Primary Examiner* — Sam K Ahn
*Assistant Examiner* — Syed Haider
(74) *Attorney, Agent, or Firm* — Coats and Bennett, P.L.L.C.

(57) ABSTRACT

An arrangement for estimating IQ-imbalance of a received OFDM-signal is disclosed. The arrangement comprises an FFT-unit (410) adapted to transform the received OFDM-signal to a frequency domain. The frequency domain comprises a plurality of sub-carrier frequencies, and the transformed received OFDM-signal comprises pilot symbols on one or more sub-carrier frequencies and symbols other than pilot symbols on one or more other sub-carrier frequencies. The arrangement also comprises channel estimation circuitry (430, 445), and an IQ-imbalance estimation unit (440) adapted to estimate the IQ-imbalance based on at least one of the pilot symbols, a determined estimated channel value for the sub-carrier frequency of the at least one pilot symbol, an estimate of the transmitted information symbol on the corresponding mirror sub-carrier frequency associated with the at least one pilot symbol and an estimated channel value for the corresponding mirror sub-carrier frequency associated with the at least one pilot symbol. Wherein the corresponding mirror sub-carrier frequency comprises a symbol other than a pilot symbol. A corresponding method and a computer program product are also disclosed.

17 Claims, 4 Drawing Sheets

(56) References Cited

U.S. PATENT DOCUMENTS

| | | |
|---|---|---|
| 2005/0180518 A1 | 8/2005 | Brotje et al. |
| 2005/0180534 A1 | 8/2005 | Brotje et al. |
| 2007/0263667 A1 | 11/2007 | Dubuc et al. |
| 2007/0297324 A1 | 12/2007 | Lindoff et al. |
| 2008/0002795 A1* | 1/2008 | Morche et al. ................ 375/349 |
| 2008/0037410 A1 | 2/2008 | Egashira et al. |
| 2008/0219386 A1* | 9/2008 | Chrabieh et al. .............. 375/343 |
| 2008/0279221 A1* | 11/2008 | Wen et al. ..................... 370/500 |

\* cited by examiner

METHOD AND ARRANGEMENTS FOR ESTIMATING IQ-IMBALANCE

TECHNICAL FIELD

The present invention relates generally to the field of estimating in-phase/quadrature imbalance (IQ-imbalance). More particularly, it relates to estimating IQ-imbalance of a received Orthogonal Frequency Division Multiplexing signal (OFDM-signal).

BACKGROUND

Many OFDM-based systems, such as the Universal Mobile Telecommunications Standard Long Term Evolution (UMTS LTE), require that receivers of the system are able to process a received OFDM-signal to acquire a relatively high signal-to-noise ratio (SNR). The receiver should be able to process the signal without introducing impairments or noise (or at least without introducing impairments or noise that are of a severe nature). Further, the receiver should be able to adjust for impairments and/or noise introduced by the channel over which the received OFDM-signal was transmitted.

Furthermore, many OFDM-based systems employ complex transmission schemes, such as Multiple-Input Multiple-Output (MIMO) and/or large signal constellations, which may further increase the demands on the receiver.

To be able to meet such demands of high SNR in receivers operating in OFDM-systems, an expensive radio design may be required. Alternatively (or additionally) methods may be employed that are able to handle radio imperfections resulting from a non-optimal radio design.

One radio imperfection is IQ-imbalance. IQ-imbalance is one of the more limiting radio imperfections, and is thus important to dispose of or at least suppress.

IQ-imbalance may be generated by anything that affects the in-phase (I) and quadrature (Q) components of the received OFDM-signal differently. One example source of IQ-imbalance is a local oscillator of a receiver or a transmitter (or both). Another example source of IQ-imbalance is mismatch between one or more blocks in the respective I- and Q-paths of the receiver chain. Examples of blocks that may experience such mismatch are amplifiers and channel filters.

IQ-imbalance can be modeled, in the receiver, as a difference in phase and amplitude between the in-phase and quadrature oscillator components (i.e. the carriers). After down-converting the received signal to a baseband signal in down-conversion mixers, this difference in phase and amplitude results in a leakage between the in-phase and quadrature components of the baseband signal. Thus, the real part of the symbols will affect the imaginary part of the symbols, and vice versa.

In OFDM, data is transmitted in parallel on a number of sub-carriers (or sub-carrier frequencies), which may be efficiently implemented by using an inverse fast Fourier transform (IFFT) in the transmitter, and a fast Fourier transform (FFT) in the receiver. If the size of the FFT is N, then N samples at the output of the FFT are referred to as an OFDM-symbol (i.e. a frequency domain OFDM-symbol).

Each OFDM-symbol thus comprises data on N sub-carriers. Each such piece of data will be referred to as a symbol (in contrast to an OFDM-symbol), and may comprise a pilot symbol or an information symbol. In UMTS LTE, a symbol as described above may be denoted a resource element, and a pilot symbol may be denoted a reference signal.

In an OFDM-based system, the baseband signal is thus transformed, in the receiver, to a frequency domain signal and this is commonly achieved by applying an FFT to the baseband signal. When transformed to the frequency domain, the IQ-imbalance affects the frequency domain signal in frequency pairs. Thus, the symbols on sub-carrier N−k leak into sub-carrier k and vice versa. This may be expressed by the following frequency domain expression:

$$Y_{IQ}(k) = K_1 Y_0(k) + K_2 Y_0^*(N-k), \qquad (1)$$

where * denotes conjugate, $K_1$ and $K_2$ are factors that depend on the phase and amplitude mismatch (for example in the local oscillator or of blocks in the respective I- and Q-paths of the receiver chain), $Y_0(k)$ is what the received signal would have been if there was no IQ-imbalance, and $Y_{IQ}(k)$ is the actually received signal. It may be noted that the notation of sub-carrier N−k is equivalent to sub-carrier −k. This is due to the N-periodicity of the FFT. Throughout this application, sub-carrier N−k will be denoted the mirror sub-carrier of sub-carrier k, and sub-carriers k and N−k will be denoted a frequency pair.

The leakage from a sub-carrier to another sub-carrier is a form of inter-carrier interference (ICI), and will degrade the SNR in the receiver. Thus, in order to achieve a high SNR while allowing for a less expensive radio design, it may be desirable to measure (or estimate) the IQ-imbalance and perform compensation on the received signal for the estimated IQ-imbalance. For example, the value $\rho = K_2/K_1^*$ can be estimated. The estimated value $\hat{\rho}$ can then be used to perform compensation on the received signal. The estimated value $\hat{\rho}$ may, for example, be determined based on known pilot values and known channel values (e.g. channel estimates). If the value $\hat{\rho}$ is accurately estimated, the compensation will cancel the leakage from the mirror sub-carrier completely.

Estimating the value $\rho$ accurately requires knowledge of the channel as well as of the transmitted symbols for each frequency pair used in the estimation. Channel information could, for example, be obtained from the channel estimator. Knowledge of transmitted symbols is commonly obtained by the use of pilot symbols. Thus, to be able to perform an accurate estimation of the value $\rho$ pilots need to be distributed on both sub-carriers of each frequency pair used in the estimation.

However, pilot symbol distribution is in general defined in the standard to be applied. Thus, access to pilot information on frequency pairs depends on how the pilot distribution is defined in the standard. In UMTS LTE, for example, the pilots are not placed on mirror frequency pairs. This is a severe obstacle when estimating the value $\rho$ and performing IQ-imbalance compensation, and limits the possibility of straightforward use of this approach.

Thus, there is a need for improved methods of and arrangements for estimating IQ-imbalance of a received OFDM-signal.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods of and arrangements for estimating IQ-imbalance of a received OFDM-signal.

According to a first aspect of the invention, this is achieved by a method of estimating in-phase/quadrature imbalance (IQ-imbalance) of a received Orthogonal Frequency Division Multiplexing signal (OFDM-signal). The method is suitable for use in a communication receiver. The method comprises transforming the received OFDM-signal to a frequency domain, wherein the frequency domain comprises a plurality of sub-carrier frequencies, and the transformed received OFDM-signal comprises symbols of a first type on one or more sub-carrier frequencies and symbols of a second type on one or more other sub-carrier frequencies, the symbols of the first type being pilot symbols and the symbols of the second type being symbols other than pilot symbols. The method also comprises determining an estimated channel value for at least one of the sub-carrier frequencies where the transformed received OFDM-signal comprises a symbol of the first type. The method further comprises estimating the IQ-imbalance based on at least one of the symbols of the first type, the determined estimated channel value for the sub-carrier frequency of the at least one symbol of the first type and information related to a corresponding mirror sub-carrier frequency associated with the at least one symbol of the first type, wherein the corresponding mirror sub-carrier frequency comprises a symbol of the second type.

In some embodiments, the information related to the corresponding mirror sub-carrier frequency may comprise an estimate of a transmitted information symbol on the corresponding mirror sub-carrier frequency and an estimated channel value for the corresponding mirror sub-carrier frequency, and the method may further comprise determining the estimate of the transmitted information symbol and determining the estimated channel value for the corresponding mirror sub-carrier frequency.

In some embodiments, the step of determining the estimate of the transmitted information symbol may comprise one of: dividing a received symbol by the estimated channel value, taking a decision regarding the transmitted information symbol, and decoding the received OFDM-signal and re-generating an estimate of the transmitted information symbol based on the decoded OFDM-signal.

In some embodiments, the information related to the corresponding mirror sub-carrier frequency may comprise a received symbol on the corresponding mirror sub-carrier frequency.

The step of determining an estimated channel value may comprise determining a channel estimate, and the method may further comprise applying a bias-compensating scaling factor to the IQ-imbalance estimate or the channel estimate. The step of determining an estimated channel value for a sub-carrier frequency may comprise excluding symbols of the sub-carrier frequency from the estimation.

In some embodiments, the step of estimating the IQ-imbalance may comprise estimating the IQ-imbalance based on a plurality of symbols of the first type and on the corresponding mirror sub-carrier frequencies. In some embodiments, the step of estimating the IQ-imbalance may comprise estimating the IQ-imbalance based on a plurality of OFDM-symbols. In some embodiments, the step of estimating the IQ-imbalance comprises estimating the IQ-imbalance based on a subset of available symbols of the first type.

The method may, in some embodiments, further comprise using the estimated IQ-imbalance to perform IQ-imbalance compensation of the received OFDM-signal.

According to a second aspect of the invention, a computer program product is provided comprising a computer readable medium, having thereon a computer program comprising program instructions. The computer program is loadable into a data-processing unit and adapted to cause the data-processing unit to execute method steps according to the first aspect of the invention when the computer program is run by the data-processing unit.

A third aspect of the invention is an arrangement for estimating IQ-imbalance of a received OFDM-signal. The arrangement comprises a fast Fourier transform unit (FFT-unit) adapted to transform the received OFDM-signal to a frequency domain, wherein the frequency domain comprises a plurality of sub-carrier frequencies, and the transformed received OFDM-signal comprises symbols of a first type on one or more sub-carrier frequencies and symbols of a second type on one or more other sub-carrier frequencies, the symbols of the first type being pilot symbols and the symbols of the second type being symbols other than pilot symbols. The arrangement also comprises channel estimation circuitry adapted to determine an estimated channel value for at least one of the sub-carrier frequencies where the transformed received OFDM-signal comprises a symbol of the first type. The arrangement further comprises an IQ-imbalance estimation unit adapted to estimate the IQ-imbalance based on at least one of the symbols of the first type, the determined estimated channel value for the sub-carrier frequency of the at least one symbol of the first type and information related to a corresponding mirror sub-carrier frequency associated with the at least one symbol of the first type, wherein the corresponding mirror sub-carrier frequency comprises a symbol of the second type.

In some embodiments, the channel estimation circuitry may comprise a channel estimator, the estimated channel value may be a channel estimate, and the IQ-imbalance estimation unit may be further adapted to apply a bias-compensating scaling factor to the IQ-imbalance estimate or the channel estimate.

The channel estimation circuitry may be comprised in the IQ-imbalance estimation unit in some embodiments, and may be adapted to determine an estimated channel value for a sub-carrier frequency by excluding symbols of the sub-carrier frequency from the estimation.

In some embodiments, the arrangement may further comprise an IQ-imbalance compensator adapted to perform IQ-imbalance compensation of the received OFDM-signal based on the estimated IQ-imbalance.

In some embodiments, the third aspect of the invention may additionally have features identical with or corresponding to any of the various features as explained above for the first aspect of the invention.

A fourth aspect of the invention is an OFDM-receiver comprising the arrangement according to the third aspect.

A fifth aspect of the invention is an electronic communication device comprising the OFDM-receiver according to the fourth aspect. In some embodiments, the electronic communication device may be compliant with UMTS LTE.

One of the advantages of embodiments of the invention is that accurate estimation of IQ-imbalance is possible.

Another advantage with embodiments of the invention is that precise IQ-imbalance compensation is provided for.

A further advantage of embodiments of the invention is that estimation of the IQ-imbalance that is robust against fading is provided.

A further advantage of embodiments of the invention is that low-complexity estimation of the IQ-imbalance is provided.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Figure 1:
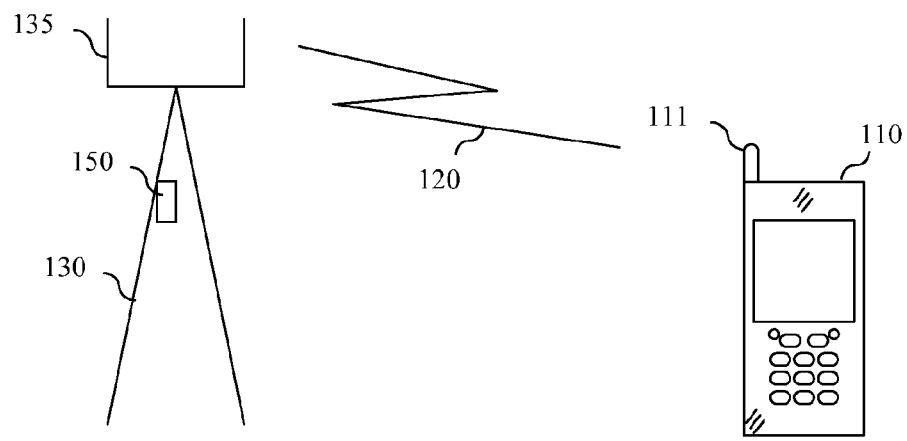
FIG. 1 is a schematic front view of a mobile terminal connected, through a radio link, to a base station site, wherein the mobile terminal may comprise arrangements according to some embodiments of the invention.

In the following, example embodiments of the invention will be described in which IQ-imbalance of a received OFDM-signal is estimated based on pilot symbols, channel values and, in some embodiments, estimates of transmitted symbols.

In some embodiments, the IQ-imbalance is estimated based on one or more frequency pairs, where pilot symbols are only available on one sub-carrier of a frequency pair. In such embodiments, information relating to the other (mirror) sub-carrier of the frequency pair may be used in the estimation. In some embodiments, the information relating to the mirror sub-carrier may be an estimate of the symbol transmitted on the mirror sub-carrier of the frequency pair. In some embodiments, the information relating to the mirror sub-carrier may be a received symbol of the minor sub-carrier of the frequency pair.

The estimate of the transmitted symbols may be achieved in various ways. For example, the estimate may not be explicitly calculated, but is implicit in the IQ-imbalance estimation. In some embodiments, the estimate is the received symbol divided by a channel estimate and a soft symbol estimate results. The estimate may be calculated according to $$\hat{S}(N-k) = \frac{Y_{IQ}(N-k) - \hat{\rho}(\hat{H}(k)P(k))^*}{\hat{H}(N-k)}, \quad (2)$$

where P(k) denote a known pilot symbol value on sub-carrier k, and $\hat{H}(k)$ and $\hat{H}(N-k)$ denote estimates of channel values on sub-carrier k and the mirror sub-carrier N−k, respectively. An old estimation of $\rho$ may, for example, be used as $\hat{\rho}$. If $\hat{\rho}$ is set to zero the special case $\hat{S}(N-k)=Y_{IQ}(N-k)/\hat{H}(N-k)$ results. In some embodiments, a hard decision is taken regarding the transmitted symbol and used as an estimate. In some embodiments, the received signal is decoded and the corresponding signal is regenerated and used to provide an estimate of the transmitted symbol.

The estimated IQ-imbalance may, in some embodiments, be used to perform IQ-imbalance compensation of the received OFDM-signal.

Estimating the IQ-imbalance may, in some embodiments, comprise using the Synchronization CHannel (SCH) of UMTS LTE. The SCH can be used for cell search and initial time and frequency synchronization.

It is noteworthy that the SCH has symmetrically placed pilots, i.e. pilots are placed on mirror sub-carriers. This gives the advantage that the IQ-imbalance may be estimated based on pilot symbols and channel values alone and no estimates of transmitted symbols have to be used.

The SCH only occupies a frequency band of 1.25 MHz around DC (direct current, the center frequency of the baseband signal). A disadvantage with using the SCH for IQ-imbalance estimation is therefore that estimation of the IQ-imbalance close to the edge frequencies of the baseband signal is not possible. This may be an important drawback if, for example, the IQ-imbalance is frequency dependent.

According to embodiments of the invention, the IQ-imbalance, represented by the value $\rho$, may be estimated as $$\hat{\rho} = \frac{\sum_k H(N-k)P(N-k)(Y_{IQ}(k) - H(k)P(k))}{\sum_k |P(N-k)|^2 |H(N-k)|^2}, \quad (3)$$

where P(k) and P(N−k) denote known pilot values of a frequency pair, and H(k) and H(N−k) denotes known channel values.

In general, the channel values are not known, and must be replaced by estimates $\hat{H}(k)$ and $\hat{H}(N-k)$.

In embodiments where pilot symbols are only available on one sub-carrier of a pair, an estimate of the symbol transmitted on the mirror sub-carrier of the pair may be used in the estimation instead of the pilot symbol. If, for example, no pilot is available on sub-carrier N−k, then P(N−k) may replaced by an estimate of the transmitted symbol $\hat{S}(N-k)$, and the IQ-imbalance estimation would be represented as $$\hat{\rho} = \frac{\sum_k \hat{H}(N-k)\hat{S}(N-k)(Y_{IQ}(k) - \hat{H}(k)P(k))}{\sum_k |\hat{S}(N-k)|^2 |\hat{H}(N-k)|^2}. \quad (4)$$

It is possible to do the opposite substitution, i.e. replacing P(k) by an estimate of the transmitted symbol $\hat{S}(k)$, $$\hat{\rho} = \frac{\sum_k \hat{H}(N-k)P(N-k)(Y_{IQ}(k) - \hat{H}(k)\hat{S}(k))}{\sum_k |P(N-k)|^2 |\hat{H}(N-k)|^2}. \quad (5)$$

However, in such an embodiment, using an estimate of the transmitted symbol achieved by dividing the received symbol by a channel estimate may be an inferior solution. (Since, if substituting $\hat{S}(k)$ by $Y_{IQ}(k)/\hat{H}(k)$ in equation (5), the expression becomes zero.) Using any other estimate of the transmitted symbol may be used though. Alternatively, $\hat{S}(k)$ may be set to zero in (5) and the IQ-imbalance estimation would result from $$\hat{\rho} = \frac{\sum_k \hat{H}(N-k)P(N-k)Y_{IQ}(k)}{\sum_k |P(N-k)|^2 |\hat{H}(N-k)|^2}, \quad (6)$$

thus relying on the zero-mean of the data signal S(k). This IQ-imbalance estimate will, however, be less accurate, since the data signal S(k) is not modeled and thus influences the IQ-imbalance estimate as noise. It is also noted that this IQ-imbalance estimate improves with the measuring time due to the reliance on the zero-mean of the data signal.

Whether to use equation (4), (5) or (6) may also depend on the presence or not of information data symbols on the mirror frequencies. If no information data is sent on some frequency blocks, these frequencies are referred to as quiet frequencies. However, pilots may still be present even though no information data is transmitted (depending on the communication standard in use). If, for example, N−k belongs to a range of quiet frequencies, then equation (5) or (6) may be preferable, while equation (4) may be preferable if k belongs to a range of quiet frequencies.

In some embodiments of the invention, the estimated value $\hat{\rho}$ can be used for compensation, either of the time domain signal or of the frequency domain signal. If performed on the frequency domain signal, the compensation may comprise $$Y_{comp}(k) = Y_{IQ}(k) - \hat{\rho} Y_{IQ}^*(N-k). \quad (7)$$

If $\hat{\rho}$ is estimated accurately, this operation will cancel the leakage from the mirror sub-carrier N−k.

In some embodiments, an MMSE (minimum mean square error) factor $\hat{\rho}_{MMSE} = \beta \cdot \hat{\rho}$ may be used where, for example, $\beta = |\hat{\rho}|^2/(|\hat{\rho}|^2 + \sigma_\rho^2)$. The variance of the imbalance estimate $\hat{\rho}$ is denoted $\sigma_\rho^2$ and is dependent on e.g. the estimation method used, estimation time and filtering parameters. Thus, in these embodiments, the compensation may be performed according to $$Y_{MMSEcomp}(k) = Y_{IQ}(k) - \hat{\rho}_{MMSE} \cdot Y_{IQ}^*(N-k). \quad (8)$$

The factor β may give the compensation less weight if the estimated IQ-imbalance is small. This approach may be applied to avoid making a good situation worse if e.g. $\hat{\rho}$ is influenced by a momentarily large estimation noise.

The compensation may be either pre-FFT or post-FFT as stated above. Further it may be performed in a feedback loop or not.

If the compensation is to be performed in a feedback loop, a previous IQ-imbalance estimate $\rho_0$ may be combined with the new IQ-imbalance estimate Δρ to improve the result. This is due to that the IQ-imbalance is estimated based on an already compensated signal (compensated with a previous estimate), and the new IQ-imbalance estimate represents an estimate of the residual IQ-imbalance. In some embodiments, the combination of new and previous IQ-imbalance estimates may be performed as $\hat{\rho} = (\rho_0 + \Delta\rho \cdot \alpha)/(1 + \Delta\rho \cdot \rho_0^* \cdot \alpha)$, and used in either equation (7) or (8) (for use in equation (8), $\hat{\rho}$ is replaced by $\hat{\rho}_{MMSE}$). The factor α (0<α≤1) specifies a first-order filter to smoothen the imbalance estimates.

Thus, according to some embodiments of the invention, the pilot values are used on one sub-carrier of a frequency pair for IQ-imbalance estimation. On the mirror sub-carrier, the pilot value in the IQ-imbalance calculation may be replaced (explicitly or implicitly) by an estimate of the transmitted information symbol.

In some embodiments, this estimate may be generated by dividing the received signal with the channel estimate, i.e.

$\hat{S}(N-k) = Y_{IQ}(N-k)/\hat{H}(N-k)$. The channel estimate thus used may be chosen such that it depends from more than one pilot symbol according to some embodiments of the invention. If this estimate of the transmitted information symbol is used, the IQ-imbalance estimation of equation (4) may be expressed as $$\hat{\rho} = \frac{\sum_k Y_{IQ}(N-k)(Y_{IQ}(k) - \hat{H}(k)P(k))}{\sum_k |Y_{IQ}(N-k)|^2}. \quad (9)$$

Thus, the actual estimate of the transmitted information symbol need not be calculated, but is implicit in the IQ-imbalance estimation of equation (9).

In some embodiments, the estimate of the transmitted information symbol may be generated through a decision directed approach. In these embodiments, a decision $\hat{S}(N-k)$ is taken with regard to the transmitted symbol. In some of these embodiments, the decision is made based on $Y_{IQ}(N-k)/\hat{H}(N-k)$.

In yet some embodiments, the received signal is decoded and the estimate of the transmitted information symbol $\hat{S}(N-k)$ may be generated through re-generating the corresponding supposedly sent signal from the decoded signal.

The estimated channel values, $\hat{H}(k)$ and $\hat{H}(N-k)$, may be retrieved from a channel estimator of the OFDM-receiver according to some embodiments of the invention. In other embodiments, $\hat{H}(k)$ and $\hat{H}(N-k)$ may be generated separately in an IQ-imbalance estimator. In such embodiments, $\hat{H}(k)$ and $\hat{H}(N-k)$ may be generated using a different algorithm that is used in the channel estimator. In some embodiments of the invention, the channel estimates $\hat{H}(k)$ may be generated from more pilots than only P(k). For example, the channel estimates may be calculated as $$\hat{H}(k) = \frac{1}{3} \frac{Y(k) + Y(k_{-1}) + Y(k_1)}{P(k) + P(k_{-1}) + P(k_1)}, \quad (10)$$

where $k_{-1}$ and $k_1$ corresponds to the positions of the neighboring pilot symbols (in frequency or in time).

In some embodiments of the invention, the samples of frequency pairs used in the summations in equations (3), (4) and (9) are taken from different OFDM-symbols. Thus, it is possible to estimate the IQ-imbalance based on frequency pairs that cover a rather long time. This has the advantage that the estimation becomes more robust against fading variations.

The more frequency pairs that are used in the summations in equations (4), (5), (6) and (9), the more complex the IQ-imbalance estimation becomes. To reduce the complexity, a smaller number of samples can be used in accordance with some embodiments of the invention. Thus, of the available pilot symbols in an OFDM-symbol (or in several OFDM-symbols) only a subset may be used for the IQ-imbalance estimation. In these embodiments, the pilot symbols (and hence the frequency pairs) to be used in the IQ-imbalance estimation may, for example, be chosen according to a pseudorandom pattern over the available time and frequency span.

FIG. 1 illustrates an example mobile terminal 110 connected, through a radio link 120, to a base station site 130. The base station site 130 comprises one or more antennas 135 and at least one base station 150. The mobile terminal 110 may comprise an arrangement for estimating IQ-imbalance according to embodiments of the invention.

The mobile terminal 110 is illustrated as a mobile telephone in a schematic front view. This example mobile terminal 110 comprises an antenna 111 mounted on the housing of the apparatus. Alternatively, the mobile terminal 110 may have an internal antenna mounted within the housing of the apparatus. The mobile terminal 110 may even comprise multiple antennas. The mobile terminal 110 may further comprise a display, a keypad, a loudspeaker, and a microphone, which together provides a man-machine interface for operating the mobile terminal 110.

The example mobile terminal 110 is adapted to connect to a mobile telecommunication network via the wireless link 120 to the radio base station 150. Hence, a user of the mobile terminal 110 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 110 and the base station 150 may be compliant with at least one mobile telecommunication standard employing OFDM, for instance UMTS LTE, IEEE 802.11a, IEEE 802.11g, and/or WiMAX (IEEE 802.16). Alternatively or additionally, the mobile terminal 110 may be adapted to connect to a digital broadcast system and to receive signals on accordance with at least one standard for digital broadcast employing OFDM, such as DVB-T, DVB-H, T-DMB and/or DAB.

Figure 2:
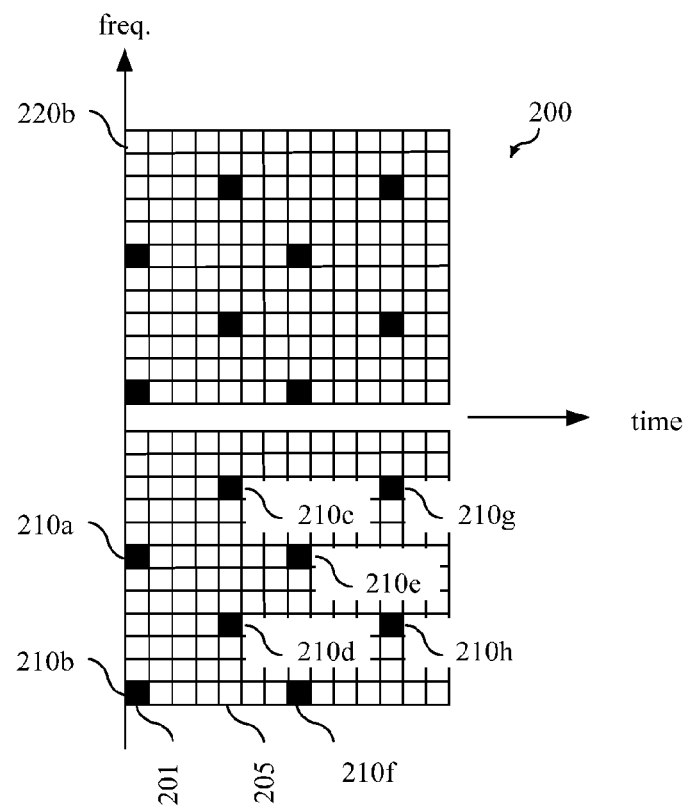
FIG. 2 is a diagram illustrating an example of pilot symbol placements in OFDM-signals.

FIG. 2 illustrates an example distribution of pilot symbols 210a-h within a time-frequency grid 200 of transmitted signals in an OFDM-system. Embodiments of the invention may be employed to estimate IQ-imbalance of a signal such as the one demonstrated in this figure. In FIG. 2, example OFDM-signals are illustrated before IFFT-processing in the transmitter. The corresponding time-frequency grid will be found in the receiver after FFT-processing.

In FIG. 2, it may be noted that pilot symbols 210a and 210b are transmitted in OFDM-symbol 201, that pilot symbols 210c and 210d are transmitted in OFDM-symbol 205, and that intermediate OFDM-symbols do not comprise any pilot symbols. Furthermore, it may be noted that pilot symbols 210a and 210b are transmitted on different sub-carriers compared to pilot symbols 210c and 210d. It may also be noted that in this example time-frequency grid 200 there are no pilot symbols on the mirror subcarriers. For example, there is no pilot symbol on sub-carrier 220b, which is the mirror sub-carrier of pilot symbol 210b.

When performing channel estimation on a signal such as the one demonstrated in FIG. 2, the channel at the positions where there are pilot symbols available may first be estimated, using any known method for channel estimation. Thereafter, the channel may also be estimated at the other positions in the time-frequency grid. One way of performing this estimation is by means of interpolation in frequency and/or in time.

Figure 3:
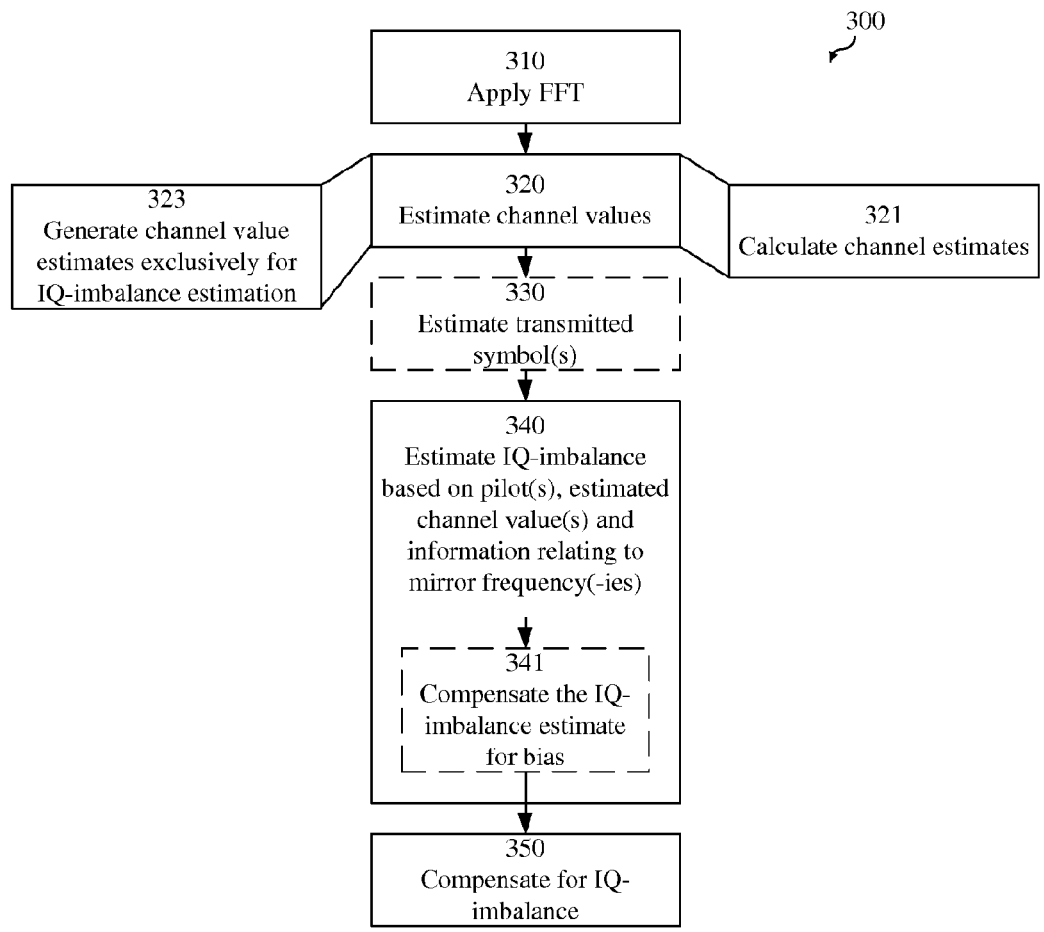
FIG. 3 is a flow chart illustrating example method steps according to some embodiments of the invention.

FIG. 3 illustrates an example method 300 according to some embodiments of the invention. In step 310, a received baseband OFDM-signal is transformed to the frequency domain by application of an FFT in an OFDM receiver.

In step 320, one or more channel values are estimated. The channel values may be estimated based on one or more pilot symbols.

The estimated channel values may be generated by a channel estimator and may comprise conventional channel estimates as illustrated by step 321. If equation (4) or (9) is to be used for IQ-imbalance estimation and if the channel estimate would be calculated as $\hat{H}(k)=Y_{IQ}(k)/P(k)$, then the result of the IQ-imbalance estimation would be zero. To avoid this, the channel estimate may be based on several sub-carriers (in time and/or in frequency) if equation (4) or (9) is to be used.

The estimated channel values may alternatively be generated exclusively for the IQ-imbalance estimation as illustrated by step 323. In these embodiments, the received symbols of the sub-carrier under estimation may be excluded from the channel value estimation, thus making bias compensation un-necessary.

In step 330, an estimate of the transmitted symbol may be determined for at least one mirror frequency of a pilot symbol. The transmitted symbol may be estimated in various ways as explained above. In some embodiments (see for example equation (9)), an estimate of the transmitted symbol is not actually calculated but is implicit in the IQ-imbalance estimation. Therefore, step 330 is illustrated as an optional step.

In step 340, the IQ-imbalance is estimated. The IQ-imbalance is estimated based at least on the pilot symbol of one or more frequency pairs, on the corresponding estimated channel value and on information related to the mirror frequency of the pilot symbol, where at least one of the mirror frequencies does not comprise a pilot symbol. In some embodiments, the information related to the mirror frequency is the estimated transmitted symbol and the corresponding estimated channel value (see for example equation (4)). In some embodiments, the information related to the mirror frequency is the received symbol (see for example equations (6) and (9)). One or several frequency pairs may be used in the estimation. The frequency pairs may be picked from a single OFDM-symbol or from several OFDM-symbols. Further, the frequency pairs may comprise all available frequency pairs (corresponding to all available pilot symbols) in a time-frequency interval, or they may comprise only some of the available frequency pairs in the time-frequency interval.

If the estimated channel values are generated by a channel estimator as illustrated by step 321 and the channel estimate is based on several sub-carriers, then a bias compensation, as illustrated by optional step 341, may also be applied. If, for example the channel estimate is based on symbols from three sub-carriers, then only the two symbols not corresponding to sub-carrier k will in fact contribute to the IQ-imbalance estimate. In this particular case, the contribution will (on average) be ⅔ of the true value, and therefore a bias compensation of 3⁄2 may be applied to the IQ-imbalance estimate. If the IQ-imbalance compensation is implemented in a feedback loop, the bias will, however, decrease automatically with each iteration and a bias compensation may not be necessary.

Finally, in step 350, the IQ-imbalance estimate is used to compensate the received signal for the IQ-imbalance, either in the time domain or in the frequency domain.

Figure 4A:
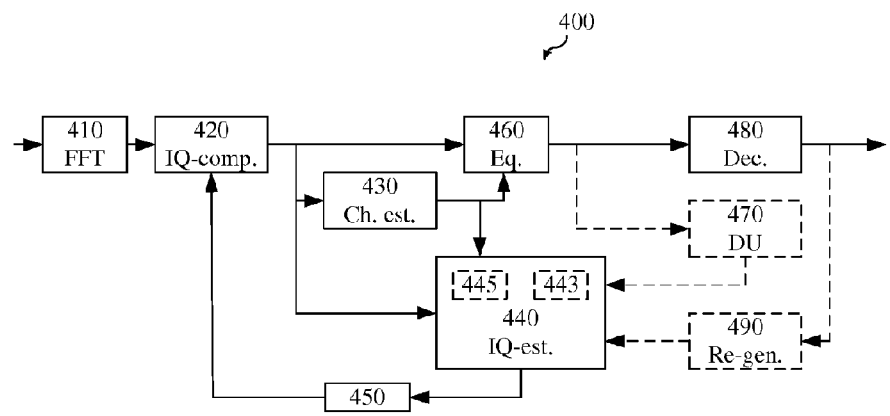
FIG. 4A is a block diagram illustrating parts of an example arrangement according to some embodiments of the invention.

FIG. 4A illustrates parts of an example arrangement 400 according to some embodiments of the invention. The arrangement may, for example perform method steps of the example method 300 as described in FIG. 3. The arrangement 400 may perform IQ-imbalance estimation and compensation according to embodiments of the invention, and may be comprised in an OFDM-receiver of an electronic communication device.

The arrangement 400 comprises an FFT unit 410. The FFT unit 410 applies an FFT to a received OFDM-signal to transform it to the frequency domain. Before being fed to the FFT unit 410, the received OFDM-signal may typically have been received by one or more antennas, and been filtered, down-converted, etc., in a receiver front end.

The arrangement 400 further comprises an IQ-compensation unit (IQ-comp.) 420. In this embodiment, the IQ-compensation unit 420 performs compensation on the transformed received OFDM-signal (i.e. after the FFT 410) based on an IQ-imbalance estimate. In other embodiments, the IQ-compensation unit 420 may be located prior to the FFT 410. The IQ-imbalance estimate is received via a delay element 450 from an IQ-imbalance estimation unit (IQ-est.) 440.

The arrangement may further comprise a channel estimator (Ch. est.) 430 and an equalizer (Eq.) 460. After equalization, the received OFDM-signal may be forwarded to a decision unit (DU) 470 and/or a decoder (Dec.) 480.

The IQ-estimation unit 440 may be adapted to estimate the IQ-imbalance based on pilot symbols, (implicitly or explicitly) estimated transmitted symbols and estimated channel values as described before. The estimated channel values may be received from the channel estimator 430 or they may be calculated in a channel value calculation unit 445 comprised in the IQ-imbalance estimation unit 440. If the transmitted symbols are not implicit in the IQ-imbalance estimation (compare with equation (9)), the transmitted symbols may be estimated by circuitry 443 within the IQ-imbalance estimation unit 440. Alternatively, the transmitted symbols may be estimated by the decision unit 470 and fed to the IQ-imbalance estimation unit 440. Yet alternatively, the transmitted symbols may be estimated by re-generating, in re-generating circuitry (Re-gen.) 490, the supposedly transmitted signal based on the output from the decoder 480 and fed the result to the IQ-imbalance estimation unit 440.

FIG. 4A demonstrates a situation where the compensation is performed post-FFT in a feedback loop. Thus, the IQ-imbalance estimate is an estimate $\Delta\rho$ of the residual IQ-imbalance as explained before and could be combined with a previous IQ-imbalance estimate $\rho_0$ to improve the result.

In an alternative embodiment, the compensation is performed pre-FFT in a feedback loop, and block 420 is placed before block 410 in the receiver chain.

Figure 4B:
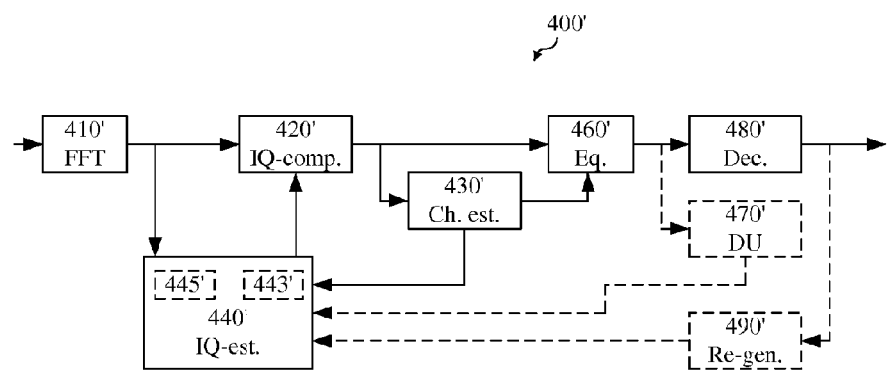
FIG. 4B is a block diagram illustrating parts of an example arrangement according to some embodiments of the invention.

FIG. 4B illustrates parts of an example arrangement 400' according to some embodiments of the invention. The arrangement may, for example perform method steps of the example method 300 as described in FIG. 3. The arrangement 400' may perform IQ-imbalance estimation and compensation according to embodiments of the invention, and may be comprised in an OFDM-receiver of an electronic communication device.

The arrangement 400' comprises an FFT unit 410'. The FFT unit 410' applies an FFT to a received OFDM-signal to transform it to the frequency domain. Before being fed to the FFT unit 410', the received OFDM-signal may typically have been received by one or more antennas, and been filtered, down-converted, etc., in a receiver front end.

The arrangement 400' further comprises an IQ-compensation unit (IQ-comp.) 420'. In this embodiment, the IQ-compensation unit 420' performs compensation on the transformed received OFDM-signal based on an IQ-imbalance estimate. The IQ-imbalance estimate is received from an IQ-imbalance estimation unit (IQ-est.) 440'.

The arrangement may further comprise a channel estimator (Ch. est.) 430' and an equalizer (Eq.) 460'. After equalization, the received OFDM-signal may be forwarded to a decision unit (DU) 470' and/or a decoder (Dec.) 480'.

The IQ-estimation unit 440' may be adapted to estimate the IQ-imbalance based on pilot symbols, (implicitly or explicitly) estimated transmitted symbols and estimated channel values as described before. The estimated channel values may be received from the channel estimator 430' or they may be calculated in a channel value calculation unit 445' comprised in the IQ-imbalance estimation unit 440'. If the transmitted symbols are not implicit in the IQ-imbalance estimation (compare with equation (9)), the transmitted symbols may be estimated by circuitry 443' within the IQ-imbalance estimation unit 440'. Alternatively, the transmitted symbols may be estimated by the decision unit 470' and fed to the IQ-imbalance estimation unit 440'. Yet alternatively, the transmitted symbols may be estimated by re-generating, in re-generating circuitry (Re-gen.) 490', the supposedly transmitted signal based on the output from the decoder 480' and fed the result to the IQ-imbalance estimation unit 440'.

FIG. 4B demonstrates a situation where the compensation is performed post-FFT and not in a feedback loop.

Figure 5:
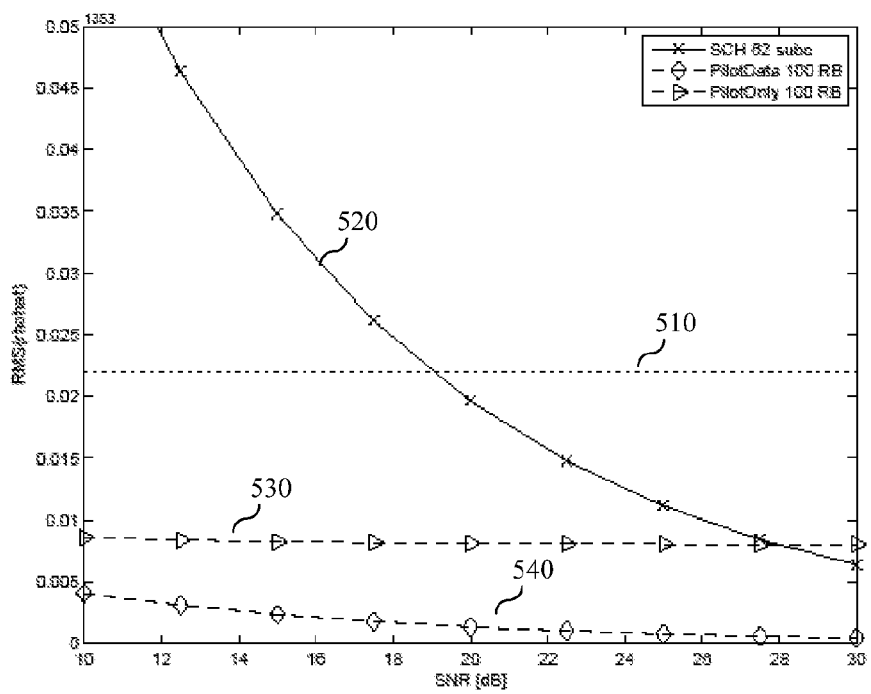
FIG. 5 is a plot illustrating advantages according to some embodiments of the invention.
Figure 6:
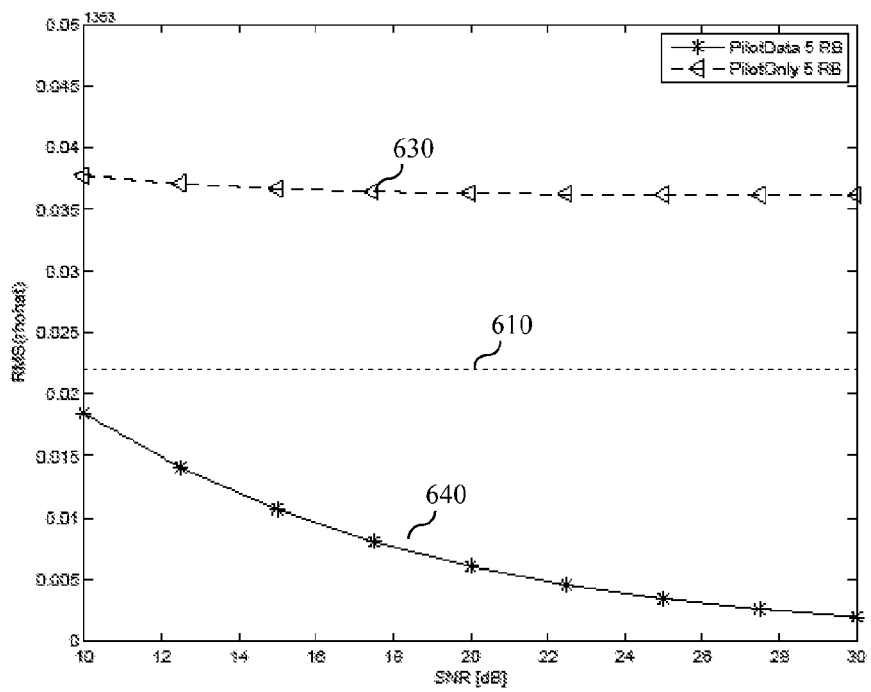
FIG. 6 is a plot illustrating advantages according to some embodiments of the invention.

FIGS. 5 and 6 illustrate performance of different IQ-imbalance estimation techniques. In FIG. 5, the root mean square (RMS) error of the IQ-imbalance estimation is shown as a function of SNR. In the simulations, a single flat estimation is made for all sub-carriers for the entire OFDM-band (i.e., it has been assumed that the IQ-imbalance is not frequency dependent). In the simulations, an OFDM-band of 18 MHz with 1200 sub-carriers of 15 kHz each, have been used.

The dashed line 510 demonstrates the imbalance level, i.e. corresponding to the performance without any IQ-imbalance estimation and compensation. The curve 520 demonstrates the performance of an IQ-imbalance estimation based on the SCH. The curve 530 demonstrates the performance of an IQ-imbalance estimation according to some embodiments of the invention based on pilots on one sub-carrier of a frequency pair but no estimated transmitted symbol on the mirror sub-carrier (compare with equation (6)). The curve 540 demonstrates the performance of an IQ-imbalance estimation according to some embodiments of the invention, where the IQ-imbalance estimation is based on pilots on one sub-carrier of a frequency pair and an (implicitly) estimated transmitted symbol on the mirror sub-carrier (compare with equation (9)).

It can be seen that the latter IQ-imbalance estimation 540, in accordance with embodiments of the invention, performs much better than the former two 520 and 530.

FIG. 6 also shows the root mean square (RMS) error of the IQ-imbalance estimation as a function of SNR. In these simulations, frequency dependency is accounted for in the estimation procedure. Thus, in this example, the 18 MHz OFDM frequency band has been divided into several frequency segments, of 900 kHz each. The IQ-imbalance has then been estimated for each frequency segment separately.

The dashed line 610 demonstrates the imbalance level, i.e. corresponding to the performance without any IQ-imbalance estimation and compensation. Basing the IQ-imbalance estimation on the SCH is not an option in this case since the IQ-imbalance is frequency dependent and SCH is not present over the entire frequency band as explained before. The curve 630 demonstrates the performance of an IQ-imbalance estimation according to some embodiments of the invention based on pilots on one sub-carrier of a frequency pair but no estimated transmitted symbol on the mirror sub-carrier (compare with equation (6)). The curve 640 demonstrates the performance of an IQ-imbalance estimation according to some embodiments of the invention, where the IQ-imbalance estimation is based on pilots on one sub-carrier of a frequency pair and an (implicitly) estimated transmitted symbol on the mirror sub-carrier (compare with equation (9)).

Again, it can be seen that the latter IQ-imbalance estimation 640, in accordance with embodiments of the invention, performs much better than the former 630. It should be noted, though, that using equation (6) might also give good performance if the estimate is taken during a longer time interval, thus lowering the root mean square (rms) value. Such results are, however, not shown in FIGS. 5 and 6.

The described embodiments of the invention and their equivalents may be performed in hardware or software or in a combination of both hardware and software.

Embodiments of the invention may be performed by general-purpose circuits associated with or integral to a receiver, such as digital signal processors (DSP), central processing units (CPU), co-processor units, or by specialized circuits such as for example application-specific integrated circuits (ASIC). All such forms are contemplated to be within the scope of the invention.

Embodiments of the invention may be implemented within an electronic apparatus comprising a receiver chain having arrangements or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station in a communication system.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the mobile terminal 110. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the method shown in FIG. 3.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method, for use in a communication receiver, of estimating in-phase/quadrature imbalance (IQ-imbalance) of a received Orthogonal Frequency Division Multiplexing signal (OFDM signal) comprising:

transforming the received OFDM signal to a frequency domain, wherein the frequency domain comprises a plurality of sub-carrier frequencies, and the transformed received OFDM signal comprises symbols of a first type on one or more sub-carrier frequencies and symbols of a second type on one or more other sub-carrier frequencies, the symbols of the first type being pilot symbols and the symbols of the second type being symbols other than pilot symbols; and determining a channel estimate for at least one of the sub-carrier frequencies where the transformed received OFDM signal comprises a symbol of the first type;

estimating the IQ-imbalance based on at least one of the symbols of the first type, the determined channel estimate for the sub-carrier frequency of the at least one symbol of the first type and information related to a corresponding mirror sub-carrier frequency associated with the at least one symbol of the first type, wherein the corresponding mirror sub-carrier frequency comprises a symbol of the second type, and wherein the information related to a corresponding mirror sub-carrier frequency associated with the at least one symbol of the first type comprises at least one of:

an estimate of a transmitted information symbol on the corresponding mirror sub-carrier frequency and an estimated channel value for the corresponding mirror sub-carrier frequency; and a received symbol on the corresponding mirror sub-carrier frequency; and applying a bias-compensating scaling factor to the estimated IQ-imbalance or the channel estimate when the channel estimate is derived based on one or more symbols that do not contribute to the estimated IQ-imbalance.

2. The method of claim 1, wherein the information related to the corresponding mirror sub-carrier frequency comprises an estimate of a transmitted information symbol on the corresponding mirror sub-carrier frequency and an estimated channel value for the corresponding mirror sub-carrier frequency, and wherein the method further comprises at least one of:

determining the estimate of the transmitted information symbol; and determining the estimated channel value for the corresponding mirror sub-carrier frequency.

3. The method of claim 2, wherein the step of determining the estimate of the transmitted information symbol comprises one of:

dividing a received symbol by the estimated channel value;

taking a decision regarding the transmitted information symbol; and decoding the received OFDM signal and regenerating an estimate of the transmitted information symbol based on the decoded OFDM signal.

4. The method of claim 1, wherein the step of determining an estimated channel value for a sub-carrier frequency comprises excluding symbols of the sub-carrier frequency from the estimation.

5. The method of claim 1, wherein the step of estimating the IQ-imbalance comprises estimating the IQ-imbalance based on a plurality of symbols of the first type and on the corresponding mirror sub-carrier frequencies.

6. The method of claim 1, wherein the step of estimating the IQ-imbalance comprises estimating the IQ-imbalance based on a plurality of OFDM symbols.

7. The method of claim 1, wherein the step of estimating the IQ-imbalance comprises estimating the IQ-imbalance based on a subset of available symbols of the first type.

8. The method of claim 1, further comprising using the estimated IQ-imbalance to perform IQ-imbalance compensation of the received OFDM signal.

9. A non-transitory computer readable medium storing a computer program comprising program instructions, the computer program being loadable into a data-processing unit of a communication receiver and adapted to cause the data-processing unit to:
- transform an Orthogonal Frequency Division Multiplexing (OFDM) signal received by the communication receiver to a frequency domain, wherein the frequency domain comprises a plurality of sub-carrier frequencies, and the transformed received OFDM signal comprises symbols of a first type on one or more sub-carrier frequencies and symbols of a second type on one or more other sub-carrier frequencies, the symbols of the first type being pilot symbols and the symbols of the second type being symbols other than pilot symbols; and
- determine a channel estimate for at least one of the sub-carrier frequencies where the transformed received OFDM signal comprises a symbol of the first type;
- estimate the IQ-imbalance based on at least one of the symbols of the first type, the determined channel estimate for the sub-carrier frequency of the at least one symbol of the first type and information related to a corresponding mirror sub-carrier frequency associated with the at least one symbol of the first type, wherein the corresponding mirror sub-carrier frequency comprises a symbol of the second type, and wherein the information related to a corresponding mirror sub-carrier frequency associated with the at least one symbol of the first type comprises at least one of:
  - an estimate of a transmitted information symbol on the corresponding mirror sub-carrier frequency and an estimated channel value for the corresponding mirror sub-carrier frequency; and
  - a received symbol on the corresponding mirror sub-carrier frequency; and
- apply a bias-compensating scaling factor to the estimated IQ-imbalance or the channel estimate when the channel estimate is derived based on one or more symbols that do not contribute to the estimated IQ-imbalance.

10. An arrangement for estimating in-phase/quadrature imbalance (IQ-imbalance) of a received Orthogonal Frequency Division Multiplexing (OFDM) signal comprising:
- a fast Fourier transform (FFT) unit adapted to transform the received OFDM signal to a frequency domain, wherein the frequency domain comprises a plurality of sub-carrier frequencies, and the transformed received OFDM signal comprises symbols of a first type on one or more sub-carrier frequencies and symbols of a second type on one or more other sub-carrier frequencies, the symbols of the first type being pilot symbols and the symbols of the second type being symbols other than pilot symbols; and
- channel estimation circuitry adapted to determine a channel estimate for at least one of the sub-carrier frequencies where the transformed received OFDM signal comprises a symbol of the first type;
- an IQ-imbalance estimation unit adapted to estimate the IQ-imbalance based on at least one of the symbols of the first type, the determined channel estimate for the sub-carrier frequency of the at least one symbol of the first type and information related to a corresponding mirror sub-carrier frequency associated with the at least one symbol of the first type, wherein the corresponding mirror sub-carrier frequency comprises a symbol of the second type, and wherein the information related to a corresponding mirror sub-carrier frequency associated with the at least one symbol of the first type comprises at least one of:
  - an estimate of a transmitted information symbol on the corresponding mirror sub-carrier frequency and an estimated channel value for the corresponding mirror sub-carrier frequency; and
  - a received symbol on the corresponding mirror sub-carrier frequency; and
- wherein the estimated IQ imbalance or the channel estimate is further adjusted by a bias-compensating scaling factor when the channel estimate is derived based on one or more symbols that do not contribute to the estimated IQ-imbalance.

11. The arrangement of claim 10, wherein the information related to the corresponding mirror sub-carrier frequency comprises an estimate of a transmitted information symbol on the corresponding mirror sub-carrier frequency and an estimated channel value for the corresponding mirror sub-carrier frequency, wherein the channel estimation circuitry is further adapted to determine an estimated channel value for the corresponding mirror sub-carrier frequency, and wherein the arrangement further comprises circuitry adapted to determine the estimate of the transmitted information symbol on the corresponding mirror sub-carrier frequency.

12. The arrangement of claim 11, wherein the circuitry adapted to determine the estimate of the transmitted information symbol on the corresponding mirror sub-carrier frequency is adapted to:
- divide a received symbol by the estimated channel value; or
- take a decision regarding the transmitted information symbol; or
- decode the received OFDM signal and re-generate an estimate of the transmitted information symbol based on the decoded OFDM signal.

13. The arrangement of claim 10, wherein channel estimation circuitry is comprised in the IQ-imbalance estimation unit and is adapted to determine an estimated channel value for a sub-carrier frequency by excluding symbols of the sub-carrier frequency from the estimation.

14. The arrangement of claim 10, further comprising an IQ-imbalance compensator adapted to perform IQ-imbalance compensation of the received OFDM signal based on the estimated IQ-imbalance.

15. The arrangement of claim 10, wherein the arrangement is included in a wireless communication receiver that is configured as an OFDM receiver for receiving the received OFDM signal.

16. The arrangement of claim 15, wherein the wireless communication receiver is included in an electronic communication device.

17. The arrangement of claim 16, wherein the electronic device is compliant with the Universal Mobile Telecommunication Standard Long Term Evolution (UMTS LTE).

* * * * *

UNITED STATES PATENT AND TRADEMARK OFFICE
CERTIFICATE OF CORRECTION

PATENT NO. : 8,737,533 B2
APPLICATION NO. : 12/937069
DATED : May 27, 2014
INVENTOR(S) : Andgart et al.

It is certified that error appears in the above-identified patent and that said Letters Patent is hereby corrected as shown below:

In the Specification

Column 5, Line 44, delete "minor" and insert -- mirror --, therefor.

Signed and Sealed this
Twenty-eighth Day of October, 2014

Michelle K. Lee
*Deputy Director of the United States Patent and Trademark Office*